United States Patent [19]

Monoi et al.

[11] Patent Number: 6,011,127
[45] Date of Patent: *Jan. 4, 2000

[54] PROCESS FOR THE PRODUCTION OF ETHYLENIC POLYMERS

[75] Inventors: Takashi Monoi; Masakazu Yamamoto; Hidenobu Torigoe; Yoshimitsu Ishihara; Shintaro Inazawa, all of Oita, Japan

[73] Assignee: Showa Denko K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/813,756

[22] Filed: Mar. 7, 1997

[30] Foreign Application Priority Data

May 20, 1996 [JP] Japan ..................................... 8-148621

[51] Int. Cl.$^7$ ........................................................ C08F 4/22
[52] U.S. Cl. .......................... 526/127; 526/153; 526/160; 526/161; 526/169; 526/172; 526/352; 526/132; 526/134
[58] Field of Search ..................................... 526/127, 132, 526/134, 153, 160, 161, 169, 172, 352

[56] References Cited

U.S. PATENT DOCUMENTS

| | | | |
|---|---|---|---|
| 5,079,317 | 1/1992 | Tajima et al. | 526/106 |
| 5,723,399 | 3/1998 | Takemoto et al. | 502/113 |

FOREIGN PATENT DOCUMENTS

| | | |
|---|---|---|
| 0 237 294 A2 | 9/1987 | European Pat. Off. . |
| 0 364 290 A2 | 4/1990 | European Pat. Off. . |
| 364290 | 4/1990 | European Pat. Off. . |
| 28 02 763 A1 | 7/1979 | Germany . |
| 54-120290 | 9/1979 | Japan . |
| 2-105806 | 4/1990 | Japan . |
| 2-123108 | 5/1990 | Japan . |
| 2-185506 | 7/1990 | Japan . |
| 4-18407 | 1/1992 | Japan . |
| 5-230136 | 9/1993 | Japan . |
| 7-503739 | 4/1995 | Japan . |
| 9-25312 | 1/1997 | Japan . |
| 9-25313 | 1/1997 | Japan . |
| 9-25314 | 1/1997 | Japan . |
| WO 93/09149 | 5/1993 | WIPO . |

*Primary Examiner*—David W. Wu
*Assistant Examiner*—Caixia Lu-Rutt
*Attorney, Agent, or Firm*—Akin, Gump, Strauss, Hauer & Feld, L.L.P.

[57] ABSTRACT

A process for the production of ethylenic polymers is disclosed in which an ethylenic monomer is polymerized in the presence of a catalyst comprising a chromium compound, an alumoxane and an organometallic alkoxide and/or organometallic siloxide and a carrier supporting thereon these compounds. The resultant polymer has a balanced proportion of rigidity and environmental stress cracking resistance (ESCR) and an excellent moldability property.

7 Claims, No Drawings

PROCESS FOR THE PRODUCTION OF ETHYLENIC POLYMERS

BACKGROUND OF THE INVENTION

1. Field of the Invention

This invention relates to a process for the production of ethylenic polymers, more particularly such a process using a novel catalyst which will afford the resultant polymer with a balanced proportion of rigidity and environmental stress cracking resistance (ESCR) and an excellent moldability property.

2. Prior Art

Ethylenic polymers have hitherto found wide application as a resinous material to produce a variety of molded articles having different properties dependent upon the specific method of molding employed and the particular usage intended. For instance, suitable ethylenic polymers for injection molding are those which have a relatively low molecular weight and a relatively narrow molecular weight distribution. However, for the production of molded articles by inflation or blow molding, there may be suitably used polymers which are relatively high in molecular weight and relatively wide in molecular weight distribution.

Ethylenic polymers may be produced in the presence of a Phillips catalyst (with chromium trioxide carried on a support of silica or other inorganic oxides), such polymers having a relatively wide molecular weight distribution eligible for blow molding.

Alternatively, ethylenic polymers suitable for blow molding may be produced in the presence of Ziegler catalyst by a single- or multi-step polymerization as disclosed in Japanese Patent Laid-Open Publication Nos. 2-123108, 4-18407 and 5-230136.

However, blow-molded articles from the above ethylenic polymers of relatively wide molecular weight distribution would have the following drawbacks:

1. Inadequate balance of rigidity and ESCR.
2. Insufficient melt tension, lending to irregularities in blown thickness and coarse surface finish.

Japanese Patent Laid-Open Publication No. 7-503739 discloses a method for the production of ethylenic polymers having a wide molecular weight distribution in the presence of a catalyst comprising chromium compounds and alumoxane. However, the resulting ethylenic polymers are not sufficient in balance of rigidity and ESCR and melt tension.

Further alternatively, there has been used a catalyst comprising a solid catalyst component with chromium trioxide supported on a carrier of inorganic oxides, alumoxane, organoaluminum alkoxide or organoaluminum siloxide thereby obtaining ethylenic polymers having a wide molecular weight distribution as disclosed in Japanese Patent Laid-Open Publication Nos. 2-105806 and 2-185506.

Japanese Patent Laid-Open Publication No. 54-120290 discloses the use of catalyst comprising alumoxane and a solid component with an ester of chromic acid supported on a silica and thereafter treated with an organoaluminum.

However, the ethylene polymers produced by the foregoing processes fail to reach a desired level of the balance of rigidity and ESCR and proper melt tension.

SUMMARY OF THE INVENTION

The present invention seeks to provide an improved process for the production of ethylenic polymers which will make available such polymers at increased rate of yield which have a well balanced proportion of rigidity and environmental stress cracking resistance (ESCR) and which are moldable to a desired specification.

It has now been found that the foregoing features of the invention can be attained by the process which is carried out in the presence of a catalyst comprising a chromium compound, an alumoxane and an organo-metallic alkoxide and/or organometallic siloxide.

According to the invention, there is provided a process for the production of ethylenic polymer which comprises polymerizing an ethylenic monomer in the presence of a catalyst comprising a chromium compound (a) selected from the group consisting of a salt of carboxylic acid, a chromium-1,3-diketo compound, an ester of chromic acid and a chromium amide compound, an alumoxane (b) and an organometallic alkoxide and/or organometallic siloxide (c) and a carrier supporting thereon these compounds.

The organometallic alkoxide includes aluminum alkoxide, magnesium alkoxide and boron alkoxide and the organometallic siloxide includes aluminum siloxide.

The carrier comprises an inorganic metal oxide or an inorganic metal halide. The carrier has a specific surface area of 50–1,000 m²/g, a pore volume of 0.5–3.0 cm³/g and an average particle size of 10–200 μm.

The catalyst used for the inventive process is prepared by supporting on the carrier with the chromium compound (a), the alumoxane (b) and the organometallic alkoxide and/or siloxide (c) in this order or an order of (a), (c) and (b). The catalyst contains the chromium compound (a) in the range of 0.05–5.0 percent by weight as the amount of Cr based on the weight of the carrier and has an atomic ratio of aluminum in the almoxane (b) to chromium in the chromium compound (a) in the range of 0.5–100, an atomic ratio of metal in organometallic alkoxide or siloxide (c) to chromium in the chromium compound (a) in the range of 0.5–100 and a molar ratio of the alumoxane (b) to the organometallic alkoxide and/or siloxide (c) in the range of 0.01–100.

DETAILED DESCRIPTION OF THE INVENTION

The invention will be further described in detail.

The chromium compound (a) (except chromium oxide) referred to herein as one of the catalyst components of the invention exemplarily includes chromium salts of carboxylic acid, chromium-1,3-diketo compounds, esters of chromic acid, chromium amide compounds. Typical examples of the chromium salt of carboxylic acid are chromium (II) compounds or chromium (III) compounds represented by the following formulae (1) and (2):

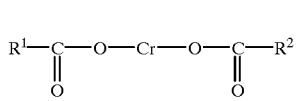

and

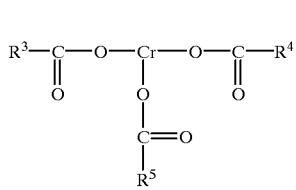

wherein $R^1$, $R^2$, $R^3$, $R^4$ and $R^5$ each are hydrogen or a $C_1$-$C_{18}$ hydrocarbon group which may be the same or different.

Specific examples include chromium (II) formate, chromium (II) acetate, chromium (II) propionate, chromium (II) butyrate, chromium (II) pentanoate, chromium (II) hexanoate, chromium (II) 2-ethylhexanoate, chromium (II) benzoate, chromium (II) naphthenate, chromium (II) oleate, chromium (II) oxalate, chromium (III) formate, chromium (III) acetate, chromium (III) propionate, chromium (III) butyrate, chromium (III) pentanoate, chromium (III) hexanoate, chromium (III) 2-ethylhexanoate, chromium (III) benzoate, chromium (III) naphthenate, chromium (III) oleate, chromium (III) oxalate, among which chromium (II) acetate, chromium (II) 2-ethylhexanoate, chromium (III) acetate, chromium (III) 2-ethylhexanoate are particularly preferred.

Typical examples of the chromium-1,3-diketo compound are chromium (III) complex having one or three 1,3-diketo compounds represented by the formula $$CrX_kY_mZ_n \qquad (3)$$

wherein X is a 1,3-diketo type chelate ligand, Y and Z are chosen from the group consisting of halogen, alkoxy, aryloxy, alkyl, aryl and amide, which may be the same or different, k+m+n is equal to 3 and k is $1 \leq k \leq 3$.

Specific examples include chromium-1,3-butanedionate, chromium acetylacetonate, chromium-2,4-hexanedionate, chromium-2,4-heptanedionate, chromium-2,4-octanedionate, chromium-3,5-octanedionate, chromium benzoylacetonate, chromium-1,3-diphenyl-1,3-propanedionate, chromium-2-methyl-1,3-butanedionate, chromium-2-ethyl-1,3-butanedionate, chromium-2-phenyl-1,3-butanedionate, chromium-1,2,3-triphenyl-1,3-propanedionate, among which chromium acetylacetonate is preferred.

Typical examples of the ester of chromic acid are chromium (VI) compound represented by the formula (4)

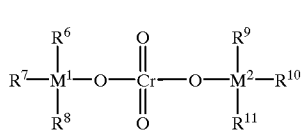

wherein $R^6$, $R^7$, $R^8$, $R^9$, $R^{10}$ and $R^{11}$ each are a $C_1$–$C_{18}$ hydrocarbon group which may be the same or different and $M^1$ and $M^2$ each are a carbon atom or silicon atom.

In the case where $M^1$ and $M^2$ are carbon, specific examples include bis(tert-butyl)chromate, bis(1,1-dimethylpropyl)chromate, bis(2-phenyl-2-propyl)chromate, bis(1,1-diphenylethyl)chromate, bis(triphenylmethly)chromate, bis(1,1,2,2-tetramethylpropyl)chromate and bis (1,1,2-trimethylpropyl)chromate, among which bis(tert-butyl)chromate is preferred.

In the case where $M^1$ and $M^2$ are silicon, specific examples include bis(trimethylsilyl)chromate, bis (triethylsilyl)chromate, bis(tributylsilyl)chromate, bis (triisopentylsilyl)chromate, bis(tri-2-ethylhexylsilyl) chromate, bis(tridecylsilyl)chromate, bis(tri(tetradecyl)silyl) chromate, bis(tribenzylsilyl)chromate, bis(triphenethylsilyl) chromate, bis(triphenylsilyl)chromate, bis(tritolylsilyl) chromate, bis(trixylylsilyl)chromate, bis(trinaphthylsilyl) chromate, bis(dimethylphenylsilyl)chromate, bis (diphenylmethylsilyl)chromate, bis(dimethylhexylsilyl) chromate, bis(dimethylisopropylsilyl)chromate, bis(tert-butyldimethylsilyl)chromate, bis(tri-tert-butylsilyl) chromate, bis(triethylphenylsilyl)chromate, bis (trimethylnaphthylsilyl)chromate, polydiphenylsilylchromate and polydiethylsilylchromate, among which bis(triphenylsilyl)chromate is preferred.

Typical examples of the chromium amide compound are chromium (II) compound and chromium (III) compound represented by the formulae (5) and (6):

(5)

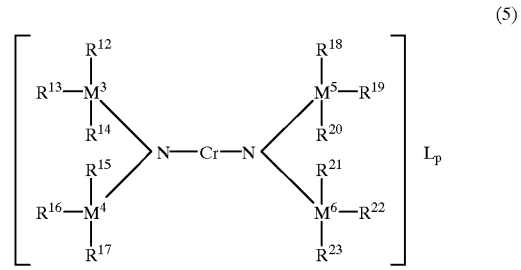

wherein $R^{12}$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ each are hydrogen or a $C_1$–$C_{18}$ hydrocarbon group which may be the same or different, $M^3$, $M^4$, $M^5$ and $M^6$ are carbon and/or silicon, L is a ligand such as ether and nitryl and p is $0 \leq p \leq 2$; and (6)

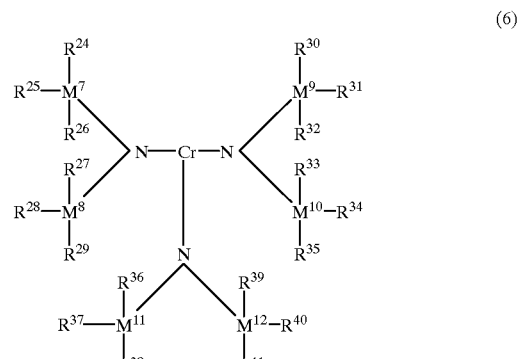

wherein $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$ and $R^{41}$ each are hydrogen or a $C_1$–$C_{18}$ hydrocarbon group which may be the same or different and $M^7$, $M^8$, $M^9$, $M^{10}$, $M^{11}$ and $M^{12}$ are carbon and/or silicon.

Specific examples include bis(bistrimethylsilylamide) chromium (II)-THF complex, bis(bistrimethylsilylamide) chromium (II)-diethylether complex, bis (methyltrimethylsilylamide)chromium (II)-THF complex, bis(methyltrimethylsilylamide)chromium (II)-diethylether complex, bis(tert-butyltrimethylsilylamide)chromium (II)-THF complex, bis(tert-butyltrimethylsilylamide)chromium (II)-diethylether complex, bis(phenyltrimethylsilylamide) chromium (II)-THF complex, bis (phenyltrimethylsilylamide)chromium (II)-diethylether complex, tris(dimethylamide)chromium (III), tris (diethylamide)chromium (III), tris(diisopropylamide) chromium (III), tris(methylphenylamide)chromium (III), tris(diphenylamide)chromium (III), tris (bistrimethylsilylamide)chromium (III), tris (bistriethylsilylamide)chromium (III), tris (bistriphenylsilylamide)chromium (III), among which tris (bistrimethylsilylamide)chromium (III) is preferred.

The structure of alumoxane and the method of making the same are fully described in the Polyhedron, 9,429–453 (1990), Ziegler Catalysts, G. Fink et al. (Eds) 57–82, Springer-Verlag (1995). Alumoxanes eligible for use in the invention may be represented by the following formulae (7) and (8):

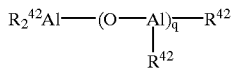  (7)

or

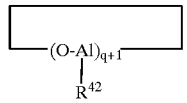  (8)

where $R^{42}$ is a hydrocarbon group such as methyl, ethyl, propyl, n-butyl and isobutyl, preferably methyl and isobutyl and q is an integer of 1–100, preferably greater than 4, more preferably greater than 8.

These compounds may be produced by any conventional methods in which for example trialkylaluminum is added to a solvent of inert hydrocarbon such as pentane, hexane, heptane, cyclohexane, decane, benzene and toluene which suspends salts having crystal water such as cupric sulfate hydrate, aluminum sulfate hydrate or the like.

Alternatively, there may be also used alumoxane represented by the following formulae (9) and (10):

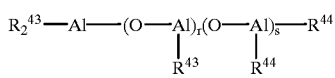  (9)

and

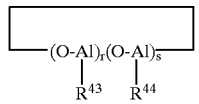  (10)

where $R^{43}$ is a hydrocarbon group such as methyl ethyl, propyl, n-butyl and isobutyl, among which methyl and isobutyl are preferred, $R^{44}$ is selected from the group consisting of a hydrocarbon group such as methyl, ethyl, propyl, n-butyl and isobutyl, halogen such as chlorine and bromine, hydrogen and hydroxyl group which may be the same but is different from $R^{43}$, r is an integer of 1–100, preferably greater than 3 and r+s is equal to 2–101, preferably greater than 6.

The alumoxane represented by the formula (9) or (10) may have $(O-Al(R^{43}))_r$ unit and $(O-Al(R^{44}))_s$ unit bonded in block, or at random regularly or irregularly. These alumoxanes may be produced in a similar manner for the production of the same of the above formulae (7) and (8) in which more than two kinds of trialkylaluminum may be used instead of one trialkylaluminum or more than one kind of dialkylaluminum monohalide or dialkylaluminum monohydride may be used.

The organometallic alkoxides and/or organometallic siloxides eligible for use in the invention is one selected from Group II or XIII compounds of the Periodic Table, the compound being represented by either one of the following formulae (11), (12), (13) and (14);

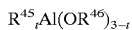  (11)

where $R^{45}$ and $R^{46}$ are a $C_1$–$C_{18}$ hydrocarbon group which may be the same or different and t is an integer of 1 or 2;

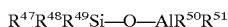  (12)

wherein $R^{47}$, $R^{48}$, $R^{49}$, $R^{50}$ and $R^{51}$ are a $C_1$–$C_{18}$ hydrocarbon group which may be the same or different;

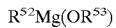  (13)

wherein $R^{52}$ and $R^{53}$ are a $C_1$–$C_{18}$ hydrocarbon group which may be the same or different; and

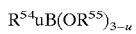  (14)

wherein $R^{54}$ and $R^{55}$ are a $C_1$–$C_{18}$ hydrocarbon group which may be the same or different and u is an integer of 1 or 2.

The organoaluminum alkoxide represented by the formula (11) exemplarily include dimethylaluminummethoxide, dimethylaluminumethoxide, dimethylaluminumisopropoxide, dimethylaluminum-n-butoxide, dimethylaluminumisobutoxide, diethylaluminumethoxide, diethylaluminumisopropoxide, diethylaluminum-n-butoxide, diethylaluminumisobutoxide, diisobutylaluminumethoxide, diisobutylaluminumisopropoxide, diisobutylaluminum-n-butoxide, diisobutylaluminumisobutoxide, di-n-hexylaluminumethoxide, di-n-hexylaluminumisopropoxide, di-n-hexylaluminumbutoxide, di-n-hexylaluminumisobutoxide, methylaluminumdimethoxide, methylaluminumdiethoxide, methylaluminumdiisopropoxide, methylaluminumdi-n-butoxide, methylaluminumdiisobutoxide, ethylaluminumdiethoxide, ethylaluminumdiisopropoxide, ethylaluminumdi-n-butoxide, ethylaluminumdiisobutoxide, isobutylaluminumdiethoxide, isobutylaluminumdiisopropoxide, isobutylaluminumdi-n-butoxide, isobutylaluminumdiisobutoxide, n-hexylaluminumdiethoxide, n-hexylaluminumdiisopropoxide, n-hexylaluminumdi-n-butoxide and n-hexylaluminumdiisobutoxide.

Amongest these compounds, preferred are monoalkoxides such as dimethylaluminummethoxide, dimethylaluminumethoxide, dimethylaluminumisopropoxide, dimethylaluminum-n-butoxide, dimethylaluminumisobutoxide, diethylaluminumethoxide, diethylaluminumisopropoxide, diethylaluminum-n-butoxide, diethylaluminumisobutoxide, diisobutylaluminumethoxide, diisobutylaluminumisopropoxide, diisobutylaluminum-n-butoxide, diisobutylaluminumisobutoxide, di-n-hexylaluminumethoxide, di-n-hexylaluminumisopropoxide, di-n-hexylaluminum-n-butoxide and di-n-hexylaluminumisobutoxide.

These compounds may be synthesized with ease by any conventional methods in which for example trialkylaluminum of the formula $R^{45}_3Al$ is reacted with alcohol of the formula $R^{46}OH$, or in which trialkylaluminum of the formula $R^{45}_3Al$ is subjected to exchange reaction with aluminumtrialkoxide of the formula $Al(OR^{46})_3$, the former reaction being preferred for the purpose of the invention.

The organoaluminum siloxides of the formula (12) exemplarily include trimethyldimethylsiloxyalane, trimethyldiethylsiloxyalane, trimethyldiisobutylsiloxyalane, trimethyl-di-n-hexylsiloxyalane, triethyldimethylsiloxyalane, triethyldiethylsiloxyalane, triethyldiisobutylsiloxyalane, triethyldi-n-hexylsiloxyalane, triphenyldimethylsiloxyalane, triphenyldiethylsiloxyalane, triphenyldiisobutylsiloxyalane and triphenyl-di-n-hexylsiloxyalane.

Amongest these compounds, preferred are trimethyldimethylsiloxyalane, trimethyldiethylsiloxyalane, trimethyldiisobutysiloxyalane, trimethyl-di-n-hexylsiloxyalane, triethyldimethylsiloxyalane, triethyldiethylsiloxyalane, triethyldiisobutylsiloxyalane and triethyl-di-n-hexylsiloxyalane.

These compounds may be synthesized with ease by the following conventional methods:

1) reaction of a silanol compound of the formula $R^{47}R^{48}R^{49}Si$—OH with an organoaluminum compound of the formula $R^{50}R^{51}RAl$;
2) reaction of cyclosiloxane with an organoaluminum compound of the formula $R^{50}R^{51}RAl$; and
3) reaction of polysiloxane with an oranoaluminum compound of the formula $R^{50}R^{51}RAl$.

$R^{47}$ through $R^{51}$ of the above formulae are the same as those of the formula (12). R of the above formula is the same as either $R^{47}$ through $R^{51}$ and is the group which is substituted upon reaction.

The organomagnesiumalkoxides represented by the formula (13) exemplarily include ethylmagnesiummethoxide, ethylmagnesiumethoxide, ethylmagnesiumisopropoxide, ethylmagnesium-n-butoxide, ethylmagnesiumisobutoxide, ethylmagnesiumphenoxide, butylmagnesiummethoxide, butylmagnesiumethoxide, butylmagnesiumisopropoxide, butylmagnesium-n-butoxide, butylmagnesiumisobutoxide and butylmagnesiumphenoxide, among which ethylmagnesiumethoxide, ethylmagnesiumisopropoxide, ethylmagnesium-n-butoxide and ethylmagnesiumisobutoxide are preferred.

These compounds may be synthesized with ease by any conventional methods in which for example dialkylmagnesium represented by the formula $R^{52}{}_2Mg$ is reacted with alcohol represented by the formula $R^{53}OH$.

The organoboronalkoxides represented by the formula (14) exemplarily include dimethylmethoxyborane, dimethylethoxyborane, dimethylpropoxyborane, dimethylbutoxyborane, diethylmethoxyborane, diethylethoxyborane, diethylpropoxyborane, diethylbutoxyborane, methyldimethoxyborane, methyldiethoxyborane, methyldipropoxyborane, methyldibutoxyborane, ethyldimethoxyborane, ethyldiethoxyborane, ethyldipropoxyborane, ethyldibutoxyborane, phenyldimethoxyborane, phenyldiethoxyborane, phenyldipropoxyborane, phenyldibutoxyborane, diphenylmethoxyborane, diphenylethoxyborane, diphenylpropoxyborane and diphenylbutoxyborane.

Amongst the compounds, preferred are dimethylmethoxyborane, dimethylethoxyborane, dimethylpropoxyborane, dimethylbutoxyborane, diethylmethoxyborane, diethylethoxyborane, diethylpropoxyborane and diethylbutoxyborane.

These compounds may be synthesized with ease by any conventional method such as by exchange reaction of Grignard reagent represented by the formula $R^{54}MgX$ wherein X is halogen or an organolithium reagent represented by the formula $R^{54}Li$ with ester of boric acid represented by $B(OR^{55})_3$.

The organometallic alkoxides and organometallic siloxides represented by the above formulae (11)–(14) may be used singly or in combination.

The catalyst used for the inventive process comprises a carrier such as inorganic oxide and inorganic halide supported thereon with the catalyst components. The carrier have a specific surface area of 50–1,000 m²/g, preferably 200–800 m²/g, a pore volume of 0.5–3.0 cm³/g, preferably 1.0–2.5 cm³/g and an average particle size of 10–200 μm, preferably 50–150 μm. Inorganic oxides eligible for the carrier exemplarily include the oxides of metals of Group II, IV, XIII or XIV in the Periodic Table such as magnesia, titania, zirconia, alumina, aluminum phosphate, silica, silica-titania, silica-zirconia, silica-alumina and mixture thereof.

These inorganic oxides are preferably those which are calcined in fluid state through molecular sieves in the presence of sufficient dry nitrogen gas at 100–900° C. for 10 minutes to 24 hours.

Inorganic halides eligible for the carrier exemplarily include the halides of metal of Group II or XIII in the Periodic Table such as magnesium chloride, magnesium bromide, magnesium iodide, calcium chloride, aluminum chloride, gallium chloride and mixtures thereof.

The catalyst may be derived by a method in which a chromium compound, an alumoxane, an organometallic alkoxide and/or organometallic siloxide and a carrier are introduced into a reaction vessel. Preferably the carrier is supported thereon with the chromium compound, followed by the addition of the alumoxane, the organometallic alkoxide and/or organometallic siloxide. More preferably, the carrier is supported thereon with the chromium compound, followed by the addition of the alumoxane and then the organometallic alkoxide and/or organometallic siloxide.

Each of the catalyst components is preferably reacted in an inert hydrocarbon solvent including propane, butane, isobutane, pentane, hexane, heptane, cyclohexane, decane, benzene, toluene and xylene. The amount of the solvent used in optional. After the completion of reaction, the solvent can be removed in vacuum or separated by filtration. The chromium compound should be supported in an amount of 0.05 to 5.0 percent by weight as the amount of Cr based on the weight of the carrier, preferably 0.05 to 2.0 percent by weight. The alumoxane should be supported in an amount of 0.5 to 100, by an atomic ratio of aluminum to chromium.

The organometallic alkoxide and/or organometallic siloxide should supported in an amount of 0.5 to 100, by atomic ratio of B, Mg or Al in organometallic alkoxide and/or organometallic siloxide to chromium.

The alumoxane and the organometallic alkoxide and/or organometallic siloxide are used in a molar ratio of 0.01 to 100.

The reaction temperature is in the range of from 0° C. to boiling point of the solvent. The time length for the above treatment and reaction ranges from 5 minutes to 24 hours.

The inventive process may be carried out by applying the catalyst to liquid phase such as slurry and solution or gas phase polymerization processes. Liquid phase polymerization processes may be usually conducted in a hydrocarbon solvent including inert hydrocarbon such as propane, butane, isobutane, hexane, cyclohexane, heptane, benzene, toluene and xylene which may be used singly or in combination.

Reaction temperature in the liquid or gas phase polymerization may be at from 0 to 300° C., preferably 20 to 200° C. The molecular weight of a polymer to be formed can be controlled by feeding a predetermined amount of hydrogen into the reaction system. If necessary, copolymerization can be also conducted by feeding one or more of α-olefins such as propylene, 1-butene, 1-hexene, 4-methyl-1-pentene and 1-octene into the reaction system.

The invention will be further described by way of the following examples which are provided for purposes of illustration only.

The procedures of determining the physical properties of the polymers provided in the Inventive and Comparative Examples are identified as follows:

a) Pretreatment of polymers:
Kneaded by plastgraph (manufactured by Toyo Seiki Co.) with use of 0.2 wt % of an additive (B225, Chiba Geigy) in nitrogen atmosphere at 190° C. for 7 minutes.

b) Molecular weight and its distribution:
Number-average molecular weight (Mn) and weight-average molecular weight (Mw) were measured by a gel permeation chromatograph (GPC). Molecular weight distribution is represented by the ratio of Mw/Mn and is wider the greater the Mw/Mn ratio. GPC measurement was made of a sample concentration 2 mg/5 ml with use of Waters 50C model with column of Shodex-HT 806M in the presence of 1,2,4-trichlorobenzene at 135° C. subject to universal calibration using a monodisperse polystyrene fraction.

c) Melt flow rate:
The measurement of melt flow rate was conducted in accordance with condition 7 in Table 1 of JIS K-7210 at 190° C. with a load of 21.6 kgf and indicated as HLMFR.

d) Density:
Density was measured in accordance with JIS K-7112.

e) Melt tension:
Melt tension was measured using a melt tension tester with an orifice having a diameter of 2.1 mm and a length of 8.0 mm at a temperature of 210° C., extruding at 15 mm/min and rolling at 6.5 m/min.

f) Rigidity:
Rigidity was represented by modulus in flexure measured in accordance with JIS K-7203.

g) Environmental stress cracking resistance (ESCR):
ESCR is $F_{50}$ value measured by BTL method in accordance with JIS K-6760.

The results are shown in Table below.

INVENTIVE EXAMPLE 1

1) Synthesis of trimethyldiethylsiloxyalane 44.4 ml hexane solution containing triethylaluminum (Tosoh Akzo Co., Ltd.) in a concentration of 1.0 mol/l hexane was cooled to 0°–5° C. and then added with droplets of 5.6 ml trimethylsilanol (50 mmol of Shinetsu Kagaku Co., Ltd.). The admixture was stirred at a temperature of 25° C. for 30 minutes thereby providing hexane containing trimethyldiethylsiloxyalane in a concentration of 1.0 mol/l of hexane.

2) Preparation of Catalyst

A 100 ml flask was purged with nitrogen and fed with 4.0 grams silica (specific surface area 320 m²/g, pore volume 2.0 cm³/g, average particle size 40 μm, ES70 Grade of Crosfield Co., Ltd.) which had been calcined at 500° C. for 6 hours, followed by addition of 40 ml n-hexane to provide a slurry. This slurry was added with 1.5 ml hexane solution containing chromium (III) 2-ethylhexanoate (STREM Co., Ltd.) in a concentration of 0.1 mol/l of hexane (0.2 wt % of Cr) and then stirred at a temperature of 25° C. for 15 minutes. At the end of this period, the slurry was added with 1.5 ml hexane solution containing isobutylalumoxane (Tosoh Akzo Co., Ltd.) in a concentration of 1.0 mol/l of hexane and stirred at a temperature of 25° C. for 30 minutes. The resulting admixture was added with 0.5 ml of the above hexane solution containing trimethyldiethylsiloxyalane in a concentration of 1.0 mol/l of hexane and stirred at a temperature of 25° C. for 30 minutes, followed by removal of the solvent in vacuum to provide a catalyst comprising a carrier supporting thereon the catalyst components and having a free fluidity property.

3) Gas-phase polymerization

Gas-phase polymerization was carried out using a reaction vessel of vertical vibration type similar to a fluidized bed reactor (volume 150 cm³, diameter 50 mm, vibrating rate 420 times/minutes (7 Hz), vibrating distance 6 cm) which is fully described in the Eur. Polym. J., Vol. 21, 245 (1985).

The reaction vessel purged with nitrogen was charged with 120 mg of the above catalyst sealed in nitrogen atmosphere into an ampul and heated to 85° C., followed by pressurizing with 14 kg/cm² of ethylene. The ampul was broken by vibrating the reaction vessel, whereupon the polymerization reaction was initiated and continued at a temperature of 89° C for 2 hours. Ethylene was supplied via a flexible joint to maintain the pressure in the reaction vessel. Upon completion of the polymerization reaction, the supply of ethylene was discontinued and the reaction vessel was cooled to room temperature, followed by removal of excess gas. The reaction product was taken out to provide 20 grams particulate white polyethylene.

INVENTIVE EXAMPLE 2

The procedure of Inventive Example 1 was followed except for the use of 0.5 ml hexane solution containing diethylaluminumethoxide (Tosoh Akzo Co., Ltd.) substituted for trimethyldiethylsiloxyalane in a concentration of 1.0 molil of hexane. There was obtained 22 grams polyethylene.

INVENTIVE EXAMPLE 3

The procedure of Inventive Example 1 was followed except that 1.5 ml toluene solution containing chromium acetylacetonate (Wako Junyaku Co., Ltd.) substituted for chromium (III) 2-ethylhexanoate in a concentration of 0.1 mol/l of toluene (0.2 wt % of Cr) was used and polymerization temperature was 82° C. There was obtained 18 grams polyethylene.

INVENTIVE EXAMPLE 4

The procedure of catalyst preparation of Inventive Example 1 was followed except for the use of 1.5 ml toluene solution containing chromium acetylacetonate (Wako Junyaku Co., Ltd.) in a concentration of 0.1 mol/l of toluene substituted for chromium (III) 2-ethylhexanoate (0.2 wt% of Cr) and 0.5 ml hexane solution of diethylaluminumethoxyide (Tosoh Akzo Co., Ltd.) substituted for trimethyldiethylsiloxyalane in a concentration of 1.0 mol/l hexane. The polymerization procedure of Inventive Example 1 was also followed except that the polymerization temperature was 82° C. There was obtained 19 grams polyethylene.

INVENTIVE EXAMPLE 5

1) Synthesis of bis(triphenylsilyl)chromate

In accordance with the method disclosed in U.S. Pat. No. 2,863,891, bis(triphenylsilyl) chromate was synthesized by reaction of chromium trioxide with triphenylsilanol.

2) Preparation of Catalyst and Polymerization

A 100 ml flask was purged with nitrogen and charged with 4.0 grams silica (specific surface area 320 m²/g, pore volume 2.0 cm³/g, average particle size 40 μm of ES70 Grade of Crosfield Co., Ltd.), followed by addition of 40 ml n-hexane to provide a slurry. This slurry was added with 1.5 ml of hexane solution containing the above bis(triphenylsilyl)chromate in a concentration of 0.1 mol/l of hexane (0.2 wt % of Cr) and stirred at a temperature of 25° C. for 15 minutes. At the end of the period, the admixture was added with 1.5 ml toluene solution containing methylalumoxane (Tosoh Akzo Co., Ltd.) in a concentration of 1.0 mol/l of toluene and stirred at a temperature of 25° C. for 30 minutes. At the end of this period, the admixture was added with 0.5 ml hexane solution containing the trimethyldiethylsiloxyalane synthesized in Inventive Example 1 in a concentration of 1.0 mol/l of hexane and stirred at a temperature of 25° C. for 30 minutes. The solvent was removed from the resulting admixture in vacuum to provide a catalyst comprising a carrier supporting thereon the catalyst components and having a free fluidity property. The procedure of polymerization of Inventive Example 1 was followed except that the polymerization temperature was 85° C. There was obtained 25 grams polyethylene.

INVENTIVE EXAMPLE 6

The procedure of Inventive Example 5 was followed except for the use of 0.5 ml hexane solution containing diethylaluminumethoxide (Tosoh Akzo Co., Ltd.) substituted for trimethyldiethylsiloxyalane in a concentration of 1.0 mol/l of hexane. There was obtained 30 grams polyethylene.

INVENTIVE EXAMPLE 7

1) Synthesis of bis(tert-butyl)chromate

In accordance with the method described in Synth. Commun., 10,905 (1980), bis(tert-butyl)chromate was synthesized by reaction of chromium trioxide with tert-butanol.

2) Preparation of Catalyst and Polymerization

The procedure of Inventive Example 5 was followed except for the use of 0.5 ml hexane solution containing diethylaluminumethoxide (Tosoh Akzo Co., Ltd.) substituted for trimethyldiethylsiloxyalane in a concentration of 1.0 mol/l of hexane and 1.5 ml hexane solution containing the above bis(tert-butyl)chromate substituted for bis(triphenylsilyl)chromate in a concentration of 0.1 mol/l of hexane (0.20 wt % of Cr).

INVENTIVE EXAMPLE 8

1) Synthesis of diethylethoxyborane

In accordance with the method described in Justus Liebigs Ann. Chem., 352 (1975), diethylethoxyborane was synthesized by reacting triethylborane with ethanol in the presence of a catalyst of N,N-diethylpivalylamide.

2) Preparation of Catalyst and Polymerization

The procedure of Inventive Example 5 was followed except for the use of 1.5 ml hexane solution containing bis(tert-butyl)chromate of Inventive Example 7 substituted for bis(triphenylsilyl)chromate in a concentration of 0.1 mol/l of hexane and of 1.5 ml hexane solution containing the isobutylalumoxane (Tosoh Akzo Co., Ltd.) substituted for methylalumoxane in a concentration of 1.0 mol/l of hexane and of 0.5 ml hexane solution containing the above diethylethoxy borane substituted for trimethyldiethylsiloxyalane in a concentration of 1.0 mol/l of hexane. There was obtained 30 grams polyethylene.

INVENTIVE EXAMPLE 9

1) Synthesis of chromium (III) tris(bistrimethylsilylamide)

In accordance with the method disclosed in J. Chem. Soc. (A), 1433 (1971), chromium (III) tris(bistrimethylsilylamide) was synthesized by reaction of anhydrous chromium trichloride anhalide with lithiumbistrimethylsilylamide.

2) Preparation of Catalyst and Polymerization

The procedure of Inventive Example 5 was followed except that 1.5 ml hexane solution containing the above chromium (III) tris(bistrimethylsilylamide) substituted for bis(triphenylsilyl)chromate in a concentration of 0.1 mol/l of hexane (0.2 wt % of Cr) was used and the polymerization temperature was 92° C. There was obtained 22 grams polyethylene.

INVENTIVE EXAMPLE 10

1) Synthesis of ethylmagnesiumethoxide

In accordance with the method described in J. Chem. Soc. (A), 1118 (1968), ethylmagnesiumethoxide was synthesized by reaction of diethylmagnesium with ethanol.

2) Preparation of Catalyst and Polymerization

The procedure of Inventive Example 9 was followed except for the use of 0.5 ml hexane solution containing the above ethylmagnesiumethoxide substituted for trimethyldiethylsiloxyalane in a concentration of 1.0 mol/l of hexane. There was obtained 24 grams polyethylene.

INVENTIVE EXAMPLE 11

Slurry Polymerization

A one-liter autoclave equipped with stirrer was purged with nitrogen and charged with 500 ml anhydraus n-hexane and 40 mg catalyst having a free fluidity property and obtained by following the procedure of Inventive Example 5 except that there were used silica (specific surface area 300 m$^2$/g, pore volume 1.6 cm$^2$, average particle size 80 μm of 952 Grade of Davison) which had been calcined at 500° C. for 6 hours in place of Grade ES70 silica of Crosfield Co., Ltd. and 0.5 ml hexane solution containing diethylaluminumethoxide (Tosoh Akzo Co., Ltd.) in a concentration of 1.0 mol/l of hexane in place of hexane solution containing trimethyldiethylsiloxyalane in a concentration of 1.0 mol/l of hexane.

The autoclave was heated up to a temperature of 86° C. and pressurized with ethylene up to 28 kg/cm$^2$. The slurry polymerization was carried out with ethylene supplied to maintain this pressure. By external cooling, the polymerization temperature was maintained at a temperature of 88° C. for one hour. At the end of this period, the ethylene feed was discontinued and the autoclave was cooled to a temperature of 70° C., followed by removal of excess gas. The reaction product was taken out to provide 125 grams particulate white polyethylene.

INVENTIVE EXAMPLE 12

To prepare the catalyst, the procedure of Inventive Example 5 was followed except for the use of 1.5 ml hexane solution containing chromium (III) tris(bistrimethylsilylamide) synthesized in Inventive Example 9 in place of bis(triphenylsilyl)chromate in a concentration of 0.1 mol/l of hexane (0.2 wt % of Cr) thereby to obtain a catalyst having a free fluidity property. The process of the slurry polymerization conducted in Inventive Example 11 was followed except that the polymerization temperature was 95° C. There was obtained 84 grams particulate white polyethylene.

Comparative Example 1

The procedure of Inventive Example 1 was followed except that trimethyldiethylsiloxyalane was not used. There was obtained 18 grams of polyethylene. The resulting polyethylene was inferrior in balance of proportion in rigidity and ESCR to that of Inventive Example 1.

Comparative Example 2

The procedure of Inventive Example 3 was followed except that trimethyldiethylsiloxyalane was not used. There was obtained 15 grams of polyethylene. The resulting polyethylene was not well balanced in rigidity and ESCR and lower in melt tension as compared to that of Inventive Example 3.

Comparative Example 3

The procedure of Inventive Example 5 was followed except that trimethyldiethylsiloxyalane was not used. There was obtained 20 grams polyethylene. The resulting polyethylene was not well balanced in rigidity and ESCR and lower in melt tension as compared to Inventive Example 5.

Comparative Example 4

The procedure of Inventive Example 7 was followed except that diethylaluminumethoxide was not used. There was obtained 28 grams polyethylene. The resulting polyethylene was not well balanced in rigidity and ESCR and lower in melt tension as compared to Inventive Example 7.

Comparative Example 5

The procedure of Inventive Example 9 was followed except that trimethyldiethylsiloxyalane was not used. There was obtained 18 grams polyethylene. The resulting polyethylene was not well balanced in rigidity and ESCR and lower in melt tension as compared to Inventive Example 9.

Comparative Example 6

The procedure of Inventive Example 11 was followed except that the catalyst used in Comparative Example 3 was used. There was obtained 104 grams polyethylene. The resulting polyethylene was not well balanced in rigidity and ESCR and exhibited a melt tension lower than that of Inventive Example 11.

Comparative Example 7

The procedure of Inventive Example 11 was followed except that the polymerization reaction was carried out using 0.4 gram Phillips catalyst which comprises silica supporting thereon chromium trioxide (1.0 wt % of Cr) and had been calcined in the air at a temperature of 600° C. for 30 hours, in place of the inventive catalyst comprising chromium compound, alumoxane, organometallic alkoxide and/or organometallic siloxide and that the polymerization temperature was 102° C. The Phillips catalyst is available from W.R. Grace Corporation as 969ID. There was obtained 120 grams polyethylene. The resulting polyethylene was not well balanced in rigidity and ESCR and lower in melt tension as compared to Inventive Examples 1 through 12.

Comparative Example 8

1) Preparation of Catalyst 30 grams noncalcined silica (ES70 Grade of Crosfield Co., Ltd.) was impregnated into a solution of chromium trioxide to be supported with a chromium in an amount of 0.20 wt %, followed by evaporation of water and calcination at a temperature of 600° C. for 30 hours. A 100 ml flask was purged with nitrogen and charged with 4.0 grams of the above silica and 40 ml n-hexane thereby obtaining a slurry. This slurry was added with 1.5 ml hexane solution containing isobutylalumoxane (Tosoh Akzo Co., Ltd.) in a concentration of 1.0 mol/l of hexane and stirred at a temperature of 25° C. for 30 minutes. At the end of this period, 0.5 ml hexane solution containing trimethyldiethylsiloxyalane synthesized in Inventive Example 1 in a concentration of 1.0 mol/l of hexane was added, followed by stirring at a temperature of 25° C. for 30 minutes and removal of the solvent in vacuum. There was obtained a catalyst having a free fluidity property.

2) Polymerization

The procedure of Inventive Example 1 was followed thereby obtaining 10 grams of polyethylene. The resulting polyethylene was not well-balanced in rigidity and ESCR and lower in melt tension as compared to Inventive Examples 1 through 12.

Comparative Example 9

1) Preparation of catalyst

The procedure of Inventive Example 6 was followed except that methylalumoxane was not used.

2) Polymerization

The procedure of Inventive Example 11 was followed except for the use of 400 mg of the above catalyst and 1.5 ml toluene solution containing methylalumoxane (Tosoh Akzo Co., Ltd.) in a concentration of 0.1 mol/l of toluene. There was obtained 18 grams polyethylene. The catalyst used in this example was significantly lower in polymerization activity than that in Inventive Example 11. The resulting polyethylene was not well balanced in proportion of rigidity an ESCR and lower in melt tension as compared to Inventive Example 11.

Inventive Example 13

The procedure of Inventive Example 7 was followed except that the polymerization temperature was 95° C. There was obtained 38 grams polyethylene.

Iventive Example 14

The procedure of Inventive Example 7 was followed except that the reaction vessel was pressurized with 0.2 kg/cm$^2$ of hydrogen and the polymerization temperature was 78° C. There was obtained 21 grams polyethylene.

Comparative Example 10

For comparison with Inventive Example 13, the procedure of Inventive Example 7 was followed except that diethylaluminumethoxide was not used and the polymerization temperature was 95° C. There was obtained 32 grams polyethylene. The resulting polyethylene was not well balanced in proportion of rigidity and ESCR and lower in melt tension as compared to Inventive Example 13.

Comparative Example 11

The procedure of Inventive Example 11 was followed except that 0.4 grams a Phillips catalyst comprising a silica supported with chromium trioxide (1.9 wt % of Cr) [969 MSB catalyst of W. R. Grace Corporation, which had been calcined at a temperature of 820° C. for 18 hours ] was substituted for the catalyst used for the invention comprising a chromium compound, alumoxane, organometallic alkoxide and/or organometallic siloxide and the polymerization temperature was 100° C. There was obtained 150 grams polyethylene. The resulting polyethylene was inferior in balance of proportion of rigidity and ESCR to those of Inventive Examples 13 and 14 and lower in melt tension than those of Inventive Examples 13 and 14.

Inventive Example 15

The procedure of Inventive Example 6 was followed except that the reaction vessel was charged with ethylene together with 3 ml 1-hexene. There was obtained 35 grams polyethylene.

TABLE 1

|  |  | Mn ×10⁻⁴ | Mw ×10⁻⁴ | Mw/Mn | HLMFR | density | melt tension (g) | rigidity (kfg/cm²) | ESCR (hr) |
|---|---|---|---|---|---|---|---|---|---|
| Inventive Example | 1 | 1.51 | 25.6 | 17.0 | 4.8 | 0.9591 | 35.0 | 15500 | 52 |
| " | 2 | 1.52 | 25.5 | 16.8 | 4.6 | 0.9590 | 34.2 | 15500 | 50 |
| " | 3 | 1.45 | 26.9 | 18.6 | 4.9 | 0.9593 | 35.1 | 15700 | 54 |
| " | 4 | 1.42 | 26.0 | 18.3 | 4.6 | 0.9591 | 32.0 | 15400 | 48 |
| " | 5 | 1.30 | 26.0 | 20.0 | 4.8 | 0.9591 | 32.2 | 15500 | 55 |
| " | 6 | 1.30 | 25.7 | 19.8 | 4.1 | 0.9588 | 34.6 | 14900 | 57 |
| " | 7 | 1.40 | 25.5 | 18.2 | 4.5 | 0.9590 | 31.8 | 15000 | 48 |
| " | 8 | 1.43 | 25.8 | 18.0 | 4.5 | 0.9590 | 33.3 | 15200 | 50 |
| " | 9 | 1.50 | 25.8 | 17.2 | 4.6 | 0.9591 | 33.6 | 15400 | 52 |
| " | 10 | 1.47 | 26.1 | 17.8 | 4.7 | 0.9591 | 34.5 | 15300 | 58 |
| " | 11 | 1.28 | 25.5 | 19.9 | 4.4 | 0.9589 | 35.1 | 15300 | 55 |
| " | 12 | 1.49 | 26.0 | 17.4 | 4.4 | 0.9588 | 30.9 | 15600 | 56 |
| Comparative Example | 1 | 0.44 | 25.5 | 58.0 | 4.5 | 0.9574 | 26.0 | 13800 | 34 |
| " | 2 | 0.45 | 26.0 | 57.8 | 4.6 | 0.9574 | 25.2 | 13600 | 42 |
| " | 3 | 0.41 | 26.3 | 64.1 | 4.7 | 0.9575 | 25.5 | 13500 | 34 |
| " | 4 | 0.41 | 25.9 | 63.2 | 4.7 | 0.9574 | 25.4 | 13400 | 36 |
| " | 5 | 0.42 | 26.1 | 62.1 | 4.8 | 0.9576 | 26.1 | 13500 | 35 |
| " | 6 | 0.22 | 25.4 | 115.5 | 4.4 | 0.9573 | 24.8 | 12500 | 35 |
| " | 7 | 3.02 | 25.7 | 8.5 | 4.5 | 0.9553 | 24.8 | 13500 | 28 |
| " | 8 | 2.33 | 26.1 | 11.2 | 4.7 | 0.9562 | 27.2 | 14000 | 36 |
| " | 9 | 0.23 | 24.3 | 105.7 | 4.2 | 0.9570 | 23.1 | 12100 | 30 |
| Inventive Example | 13 | 0.75 | 14.6 | 19.4 | 33.6 | 0.9621 | 19.0 | 15000 | 24 |
| " | 14 | 0.72 | 14.5 | 20.1 | 35.1 | 0.9620 | 20.4 | 15000 | 24 |
| Comparative Example | 10 | 0.24 | 14.7 | 61.3 | 34.7 | 0.9604 | 12.3 | 13100 | 21 |
| " | 11 | 1.58 | 14.5 | 9.2 | 33.9 | 0.9590 | 11.o | 13000 | 12 |
| Inventive Example | 15 | 1.13 | 23.1 | 20.4 | 7.0 | 0.9544 | 26.2 | 13400 | 210 |

What is claimed is:

1. A process for the production of ethylenic polymers which comprises polymerizing an ethylenic monomer in the presence of a catalyst, said catalyst supported on a carrier and prepared by combining, in the presence of an inert hydrocarbon solvent:

a chromium compound (a) in an amount of 0.05 to 5.0 percent by weight as the amount of Cr based on the weight of said carrier, selected from the group consisting of a chromium salt of a carboxylic acid represented by either one of the formulae

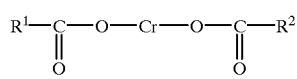

(1)

and

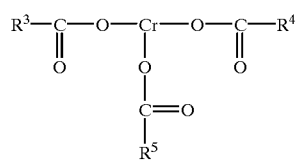

(2)

wherein $R^1$, $R^2$, $R^3$, $R^4$ and $R^5$ each are hydrogen or a $C^1$–$C_{18}$ hydrocarbon group which may be the same or different, a chromium-1,3-diketo compound represented by the formula $$CrX_kY_mZ_n \quad (3)$$

wherein X is a 1,3-diketo type chelate ligand, Y and Z are each selected from the group consisting of halogen, alkoxy, aryloxy, alkyl, aryl and amide, which may be the same or different, k+m+n is equal to 3, $1 \leq k \leq 3$, $0 \leq m \leq 2$ and $0 \leq n \leq 2$, an ester of chromic acid represented by the formula

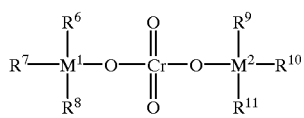

(4)

wherein $R^6$, $R^7$, $R^8$, $R^9$, $R^{10}$ and $R^{11}$ each are a $C_1$–$C_{18}$ hydrocarbon group which may be the same or different and $M^1$ and $M^2$ each are a carbon atom or silicon atom, and a chromium amide compound represented by either one of the formulae

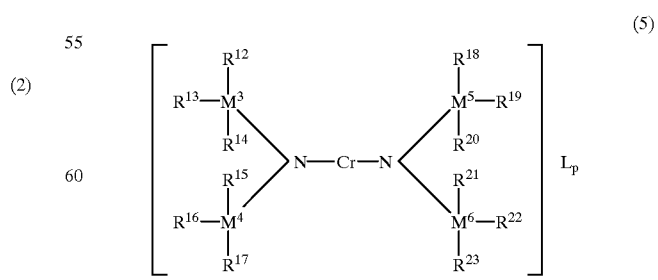

(5)

wherein $R^{12}$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are each hydrogen or a $C_1$–$C_{18}$ hydrocarbon group which may be the same or different, $M^3$, $M^4$, $M^5$ and $M^6$ are each carbon or silicon, L is a ligand selected from the group consisting of ether and nitryl, and $0 \leq p \leq 2$ and (6)

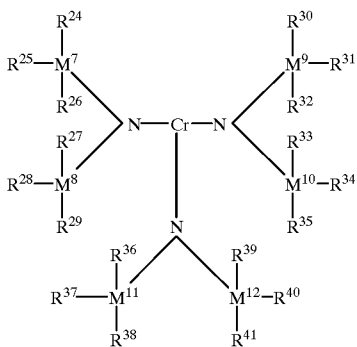

wherein $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$, $R^{39}$, $R^{40}$, $R^{41}$ each are hydrogen or a $C_1$–$C_{18}$ hydrocarbon group which may be the same or different, $M^7$, $M^8$, $M^9$, $M^{10}$, $M^{11}$ and $M^{12}$ are each carbon or silicon;

an alumoxane (b);

an organometallic alkoxide, an organometallic siloxide, or mixtures thereof, (c) selected from the group consisting of organoaluminum alkoxide, organomagnesium alkoxide, organoboron alkoxide, and organoaluminum siloxide; and removing said inert hydrocarbon solvent;

wherein said catalyst has an atomic ratio of metal present in said organometallic alkoxide, organometallic siloxide, or mixtures thereof (c) to chromium present in said chromium compound (a) in a range of from 0.5 to 100.

2. A process according to claim 1, wherein said organometallic alkoxide is an organoaluminum represented by the formula $$R^{45}{}_t Al(OR^{46})_{3-t} \quad (11)$$

where $R^{45}$ and $R^{46}$ are a $C_1$–$C_{18}$ hydrocarbon group which may be the same or different and t is an integer of 2.

3. A process according to claim 1, wherein said organometallic siloxide is an aluminum siloxide represented by the formula $$R^{47}R^{48}R^{49}Si\text{—}O\text{—}AlR^{50}R^{51} \quad (12)$$

wherein $R^{47}$, $R^{48}$, $R^{49}$, $R^{50}$ and $R^{51}$ are a $C_1$-$C_{18}$ hydrocarbon group which may be the same or different.

4. A process according to claim 1, wherein said carrier comprises an inorganic metal oxide or an inorganic metal halide.

5. A process according to claim 4, wherein said carrier has a specific surface area of 50–1,000 $m^2/g$, a pore volume of 0.5–3.0 $cm^3/g$ and an average particle size of 10–200 $\mu$m.

6. A process according to claim 1, wherein said catalyst is prepared by supporting with said chromium compound (a), said alumoxane (b) and said organometallic alkoxide, organometallic siloxide, or mixtures thereof (c) on said carrier in this order or an order of (a), (c) and (b).

7. A process according to claim 1 wherein said catalyst has an atomic ratio of aluminum in said alumoxane (b) to chromium in said chromium compound (a) in the range of 0.5–100, and a molar ratio of said alumoxane (b) to the organometallic alkoxide and/or organometallic siloxide (c) in the range of 0.01–100.

* * * * *